US012166306B2

(12) United States Patent
Cain

(10) Patent No.: US 12,166,306 B2
(45) Date of Patent: Dec. 10, 2024

(54) ELECTRICAL CONNECTOR HAVING AN ELECTRICALLY INSULATED GROUNDING LAYER

(71) Applicant: AVX Corporation, Fountain Inn, SC (US)

(72) Inventor: Jeffrey Cain, Greenville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 231 days.

(21) Appl. No.: 17/459,152

(22) Filed: Aug. 27, 2021

(65) Prior Publication Data

US 2022/0069502 A1 Mar. 3, 2022

Related U.S. Application Data

(60) Provisional application No. 63/073,546, filed on Sep. 2, 2020.

(51) Int. Cl.

| | |
|---|---|
| ***H01R 13/24*** | (2006.01) |
| ***H01R 13/40*** | (2006.01) |
| ***H01R 13/6471*** | (2011.01) |
| ***H01R 13/6473*** | (2011.01) |

(52) U.S. Cl.

CPC ......... *H01R 13/2421* (2013.01); *H01R 13/40* (2013.01); *H01R 13/6471* (2013.01); *H01R 13/6473* (2013.01)

(58) Field of Classification Search

CPC ............ H01R 13/6471; H01R 13/6473; H01R 13/2421

See application file for complete search history.

(56) References Cited

U.S. PATENT DOCUMENTS

| | | | | |
|---|---|---|---|---|
| 5,769,652 | A * | 6/1998 | Wider | H01R 24/50 439/63 |
| 6,497,579 | B1 * | 12/2002 | Garbini | H01R 13/6315 439/246 |
| 7,803,017 | B2 * | 9/2010 | Voutilainen | H05K 1/0243 439/577 |
| 8,158,242 | B2 * | 4/2012 | Nishihata | C08K 3/04 524/495 |
| 8,936,495 | B2 * | 1/2015 | Hatch | H01R 13/514 439/700 |
| 9,748,680 | B1 * | 8/2017 | Huang | H01R 12/714 |
| 10,103,485 | B2 * | 10/2018 | Ikeda | H01R 13/631 |
| RE47,459 | E * | 6/2019 | Vinther | H01R 24/42 |
| 10,312,623 | B2 * | 6/2019 | Kim | H01R 13/2471 |

(Continued)

FOREIGN PATENT DOCUMENTS

WO WO 2010/048971 A1 5/2010

*Primary Examiner* — Marcus E Harcum
(74) *Attorney, Agent, or Firm* — Dority & Manning, P.A.

(57) ABSTRACT

An electrical connector is disclosed including an outer sleeve and an inner sleeve received within the outer sleeve such that the inner sleeve contacts the outer sleeve and can slide relative to the outer sleeve in a first direction. The electrical connector can include a resilient member configured to bias the inner sleeve away from the outer sleeve in the first direction and an insulating layer covering at least a portion of the outer sleeve. The electrical connector can include a grounding layer covering at least a portion of the insulating layer. The insulating layer can electrically insulate the outer grounding layer from the outer sleeve.

18 Claims, 4 Drawing Sheets

(56) References Cited

U.S. PATENT DOCUMENTS

| | | | | |
|---|---|---|---|---|
| 10,622,765 | B2 * | 4/2020 | Song | H01R 13/17 |
| 10,916,902 | B2 * | 2/2021 | Maki | H01R 24/50 |
| 11,239,616 | B2 * | 2/2022 | Park | H01R 13/6588 |
| 11,349,235 | B2 * | 5/2022 | Jung | H01R 12/716 |
| 11,355,874 | B2 * | 6/2022 | Jung | H01R 13/6594 |
| 11,404,808 | B2 * | 8/2022 | Zheng | H01R 24/50 |
| 11,682,870 | B2 * | 6/2023 | Song | H01R 24/40 439/675 |
| 2010/0248558 | A1 * | 9/2010 | Yin | H01R 13/2421 439/824 |
| 2013/0244485 | A1 * | 9/2013 | Lam | H01R 24/58 439/580 |
| 2016/0104956 | A1 * | 4/2016 | Santos | H01R 13/2421 439/86 |
| 2019/0036240 | A1 * | 1/2019 | Imtiaz | H01R 13/6277 |
| 2019/0280439 | A1 * | 9/2019 | Ni | H01R 13/2421 |
| 2021/0083432 | A1 * | 3/2021 | Lapkowicz | H01R 13/6597 |

* cited by examiner

ELECTRICAL CONNECTOR HAVING AN ELECTRICALLY INSULATED GROUNDING LAYER

CROSS REFERENCE TO RELATED APPLICATION

The present application claims filing benefit of U.S. Provisional Patent Application Ser. No. 63/073,546 having a filing date of Sep. 2, 2020, which is incorporated herein by reference in its entirety.

BACKGROUND OF THE INVENTION

Spring-loaded pin connectors are used in many electronic devices and in the electronics testing industry. Such spring-loaded pin connectors are sometimes referred to as "pogo" pin connectors in reference to the movement of a pin component of the connector. Spring-loaded pin connectors can facilitate electrical low-stress electrical connection between various components. However, current spring-loaded pin connectors provide poor impedance matching and/or provide poor performance at high frequencies.

SUMMARY OF THE INVENTION

In accordance with one embodiment of the present invention, an electrical connector can include an outer sleeve and an inner sleeve received within the outer sleeve such that the inner sleeve contacts the outer sleeve and can slide relative to the outer sleeve in a first direction. The electrical connector can include a resilient member configured to bias the inner sleeve away from the outer sleeve in the first direction and an insulating layer covering at least a portion of the outer sleeve. The electrical connector can include a grounding layer covering at least a portion of the insulating layer. The insulating layer can electrically insulate the outer grounding layer from the outer sleeve.

In accordance with another embodiment of the present invention, a method for forming an electrical connector can include arranging a resilient member within an outer sleeve; fitting an inner sleeve within the outer sleeve such that the inner sleeve contacts the outer sleeve and can slide relative to the outer sleeve in a first direction, and such that the resilient member is configured to bias the inner sleeve away from the outer sleeve in the first direction; forming an insulating layer over a portion of the outer sleeve; and arranging a grounding layer over at least a portion of the insulating layer such that the insulating layer electrically insulates the outer grounding layer from the outer sleeve.

In accordance with another embodiment of the present invention, an electrical system can include a first electrical component having a grounding terminal and a signal terminal; a second electrical component having a grounding terminal and a signal terminal; and an electrical connector. The electrical connector can include an outer sleeve contacting the signal terminal of the second electrical component and an inner sleeve received within the outer sleeve such that the inner sleeve contacts the outer sleeve and can slide relative to the outer sleeve in a first direction. The inner sleeve of the electrical connector can contact the signal terminal of the first electrical component. The electrical connector can include a resilient member configured to bias the inner sleeve away from the outer sleeve in the first direction and an insulating layer covering at least a portion of the outer sleeve. The electrical connector can include a grounding layer covering at least a portion of the insulating layer. The insulating layer can electrically insulate the outer grounding layer from the outer sleeve. The grounding layer can contact the grounding terminal of the first electrical component and contact the grounding terminal of the second electrical component.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 2:
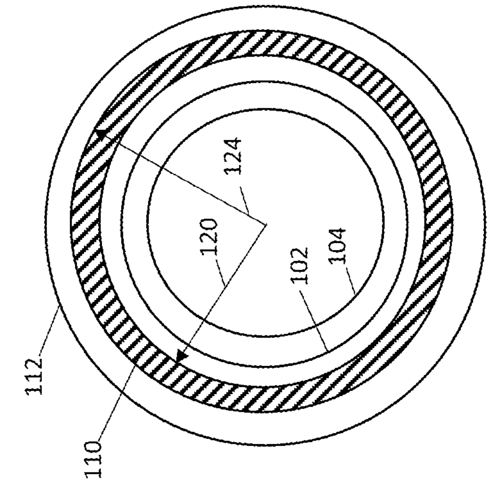
FIG. 2 is a top down view of the electrical connector of FIG. 1.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an electrical connector having improved impedance matching and/or high frequency performance. The electrical connector can provide an electrical connection between a first electrical component and a second electrical component. The electrical connector can include a grounding layer that provides an electrical connection between a grounding terminal of the first electrical component and a grounding terminal of the second electrical component. The grounding layer of the electrical component can provide a grounded electrical connection between the electrical components. The grounding layer can provide a variety of impacts including impedance matching and/or shielding, which can improve performance at high frequencies (e.g., greater than 1 GHz).

In some embodiments, the electrical connector can include an insulating layer arranged to electrically isolate the grounding layer from one or more components of the electrical connector. The insulating layer can include a variety of materials suited to tune the electrical connector to provide impedance matching. The insulating layer can be formed from a polymer composition having a relatively low dielectric constant and/or dielectric loss tangent. For example, the polymer composition may exhibit a dielectric constant of about 10 or less, in some embodiments about 8 or less, in some embodiments from about 0.1 to about 6 and in some embodiments, and in some embodiments, from about 0.5 to about 4 over a variety of frequencies (e.g., 1

MHz or 1 GHz), such as determined in accordance with IEC 60250. The dielectric loss tangent of the polymer composition, which is a measure of the loss rate of energy, may likewise be about 0.1 or less, in some embodiments about 0.08 or less, and in some embodiments from about 0.001 to about 0.06 over a variety of frequencies (e.g., 1 MHz or 1 GHz), such as determined in accordance with IEC 60250. In addition to possessing a low dielectric constant and/or dielectric loss tangent, the polymer composition is also typically thermoplastic in nature so that it is readily flowable. To ensure that the polymer composition is able to readily withstand surface mount soldering of the electrical connector, it is typically desired that the melting temperature of the polymer composition may, for instance, be about 240° C. or more, in some embodiments about 250° C., in some embodiments from about 260° C. to about 400° C., and in some embodiments, from about 270° C. to about 380° C.

The polymer composition may include one or more thermoplastic polymers having the desired characteristics noted above. Examples of such polymers may include, for instance, polyamides, polyolefins, polyesters, polyarylene sulfides, polyaryletherketones, polycarbonates, polyphenylene oxides, polyetherimides, etc. In one embodiment, for example, the thermoplastic polymer may be a polyamide, such as an aliphatic polyamide, semi-aromatic polyamide, or wholly aromatic polyamide. In one particular embodiment, the polyamide may be an aliphatic polyamide that is formed only from aliphatic monomer units (e.g., diamine and dicarboxylic acid monomer units), such as polyamide 4 (polypyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), etc.

In certain embodiments, the polymer composition may be formed entirely from thermoplastic polymers. In other embodiments, however, certain additives may optionally be employed in the polymer composition. Examples of such additives may include, for instance, particulate fillers (e.g., talc, mica, etc.), fibrous fillers (e.g., glass fibers), pigments, antioxidants, stabilizers, flame retardants, lubricants, flow modifiers, and so forth. For instance, a fibrous filler (e.g., glass fibers) may be employed in the polymer composition to help further improve the mechanical properties of the insulating layer. Suitable glass fibers include those formed from E-glass, A-glass, C-glass, D-glass, AR-glass, R-glass, S1-glass, S2-glass, etc., as well as mixtures thereof. The median diameter of the glass fibers may range from about 0.1 to about 35 micrometers, in some embodiments from about 2 to about 20 micrometers, and in some embodiments, from about 3 to about 10 micrometers. When employed, optional additives (e.g., fibrous fillers) typically constitute from about 5 wt. % to about 60 wt. %, in some embodiments from about 10 wt. % to about 50 wt. %, and in some embodiments, from about 20 wt. % to about 45 wt. % of the polymer composition. Likewise, thermoplastic polymers may constitute from about 40 wt. % to about 95 wt. %, in some embodiments from about 50 wt. % to about 90 wt. %, and in some embodiments, from about 55 wt. % to about 80 wt. % of the polymer composition.

In some embodiments, the electrical connector can include an outer sleeve and an inner sleeve received within the outer sleeve such that the inner sleeve can slide relative to the outer sleeve in a first direction. The electrical connector can include a resilient member (e.g., a spring) configured to bias the inner sleeve away from the outer sleeve in the first direction. The insulating layer can cover at least a portion of the outer sleeve. A grounding layer can cover at least a portion of the insulating layer. The insulating layer can electrically insulate the outer grounding layer from the outer sleeve.

The inner sleeve can form an electrical connection between two components. The inner sleeve can be pushed against the resilient member and into the outer sleeve when the electrical connector is connected between two components. The inner sleeve can form an electrical connection with a signal terminal of one of the components.

One or more components of the electrical connector can be sized to provide impedance matching. For example, the grounding layer can have a circular cross-section having an inner radius in a second direction that is perpendicular to the first direction. The outer sleeve can have a circular cross-section having an outer radius in the second direction. A ratio of the inner radius to the outer radius can be selected to provide the electrical connector with an impedance of about 50 ohms. For example, in some embodiments, the ratio can range from about 2 to about 1.05 in some embodiments from about 1.7 to about 1.1, and in some embodiments from about 1.6 to about 1.2.

The outer radius of the outer sleeve can range from about 0.2 mm to about 5 mm, in some embodiments from about 0.5 mm to about 4 mm, in some embodiments from about 1 mm to about 3 mm. The inner radius of the ground layer can range from about 0.1 mm to about 0.2 mm to about 5 mm, in some embodiments from about 0.5 mm to about 4 mm, in some embodiments from about 1 mm to about 3 mm.

The electrical connector can have a variety of suitable sizes. For example, an uncompressed length of the electrical connector can range from about 1 mm to about 12 mm, in some embodiments from about 1.5 mm to about 10 mm, in some embodiments from about 2 mm to about 8 mm. A compressed length of the electrical connector can range from about 0.5 mm to about 10 mm, in some embodiments from about 1 mm to about 8 mm, in some embodiments from about 3 mm to about 7 mm. An outer diameter of the electrical connector can range from about 0.5 mm to about 8 mm, in some embodiments from about 1 mm to about 7 mm, in some embodiments from about 2 mm to about 6 mm.

I. Example Embodiments

Figure 1:
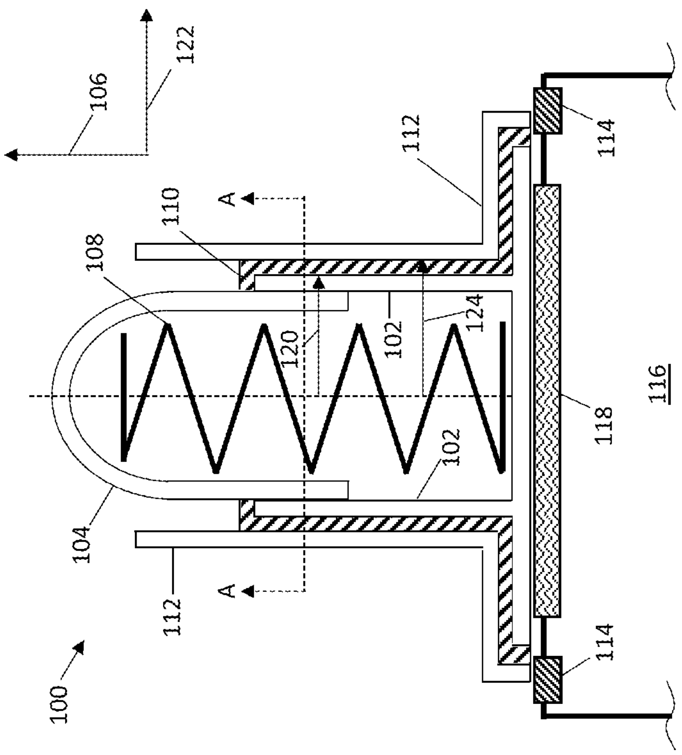
FIG. 1 is a side elevation view of an embodiment of an electrical connector according to aspects of the present disclosure.

FIG. 1 is a side elevation view of an embodiment of an electrical connector 100. FIG. 2 is a top down view of the electrical connector 100 of FIG. 1. The electrical connector 100 can include an outer sleeve 102 and an inner sleeve 104 received within the outer sleeve 102 such that the inner sleeve 104 can slide relative to the outer sleeve 102 in a first direction 106. The electrical connector 100 can include a resilient member 108 (e.g., a spring) configured to bias the inner sleeve 104 away from the outer sleeve 102 in the first direction 106. An insulating layer 110 can cover at least a portion of the outer sleeve 102. A grounding layer 112 can cover at least a portion of the insulating layer 110. Thus, the insulating layer 110 can be arranged between the outer sleeve 102 and the grounding layer 112. The insulating layer 110 can electrically insulate the outer grounding layer 112 from the outer sleeve 102.

The grounding layer 112 can be electrically connected with one or more grounding terminals 114 (e.g., of a first electrical component 116). The outer sleeve 102 can be electrically connected with a signal terminal 118 (e.g., of the first electrical component 116).

One or more components of the electrical connector 100 can be sized to provide impedance matching. For example, referring to FIG. 2, the grounding layer 112 can have a circular cross-section in the first direction 106 and an inner radius 124 in a second direction 122 that is perpendicular to the first direction 106. The outer sleeve 112 can have a circular cross-section in the first direction 116 and have an outer radius 120 in the second direction 122. A ratio of the inner radius 124 to the outer radius 120 can be selected to provide the electrical connector with impedance matching, for example to provide the electrical connector with an impedance of about 50 ohms. For example, in some embodiments, the ratio can range from about 1.05 to about 2 in some embodiments from about 1.1 to about 1.7, and in some embodiments from about 1.2 to about 1.6.

Figure 3:
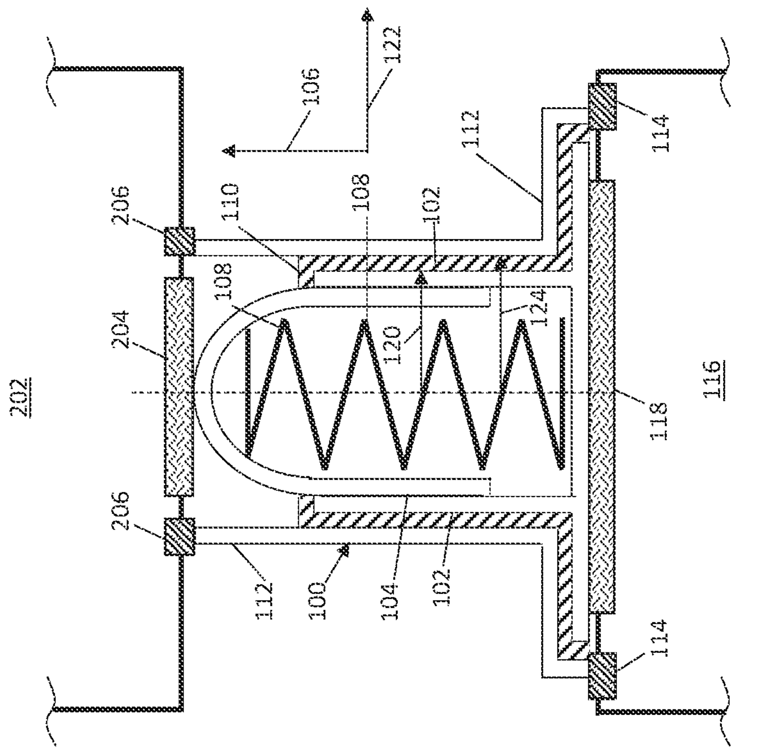
FIG. 3 illustrates the electrical connector of FIGS. 1 and 2 connected between a first component and a second component.

FIG. 3 illustrates the electrical connector 100 of FIGS. 1 and 2 connected between the first component 116 and a second component 202. The inner sleeve 104 can be moved in the first direction 106 and pushed against the resilient member 108.

The resilient member 108 can bias the inner sleeve 104 against signal terminal 204 of the second component 202. The inner sleeve 104 can contact and/or be coupled with (e.g., soldered to) a signal terminal 204 of the second component 202 to electrically connect the signal terminal 118 of the first electrical component 116 with the signal terminal 204 of the second component 202. The grounding layer 112 can contact and/or be coupled with (e.g., soldered to) one or more grounding terminals 206 of the second component 202 to electrically connect the grounding terminals 114 of the first component 116 with the grounding terminals 206 of the second component 202. Thus, the electrical connector 100 can electrically connect the signal terminal 118 of the first electrical component 116 with the signal terminal 204 of the second component 202. The electrical connector 100 can electrically connect the grounding terminals 114 of the first component 116 with the grounding terminals 206 of the second component 202.

II. Example Method

Figure 4:
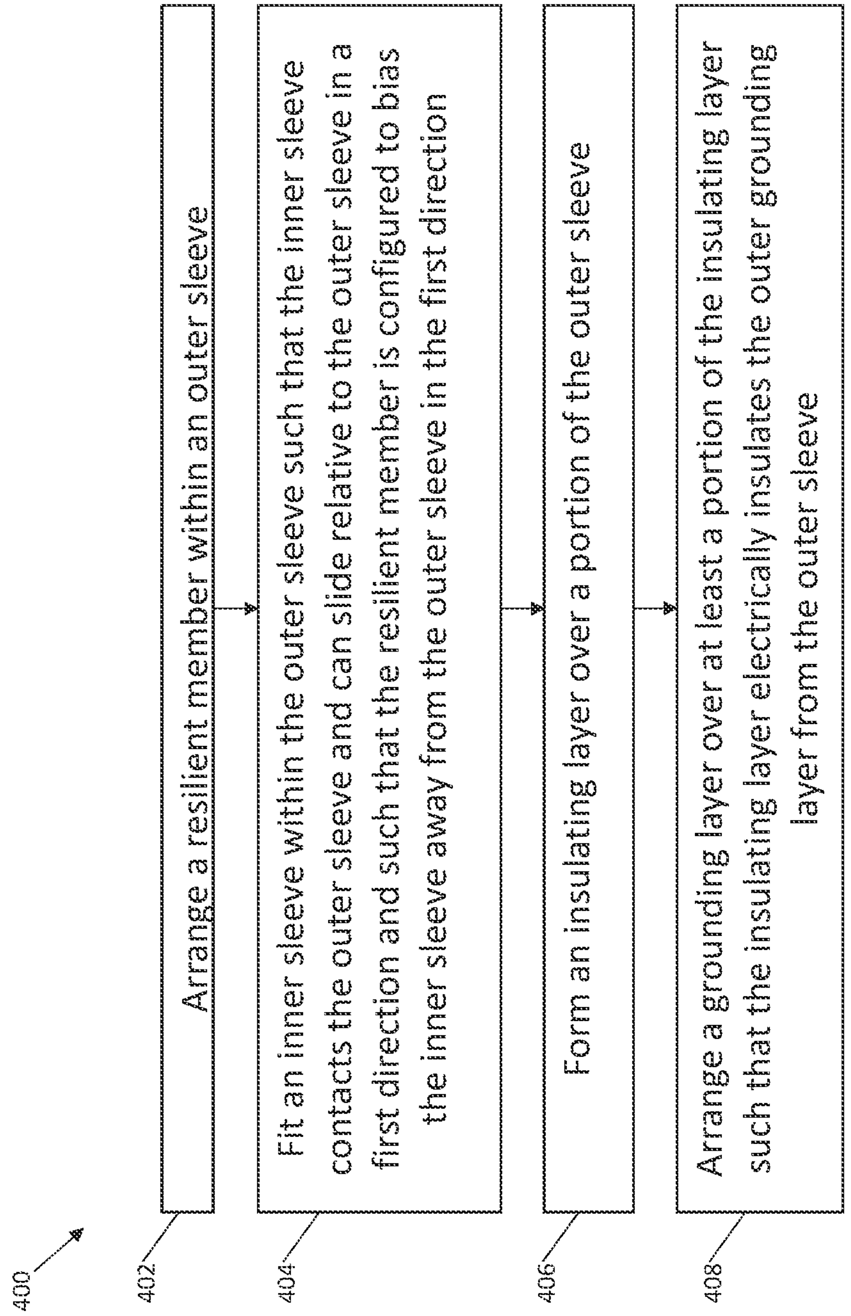
FIG. 4 illustrates an example method for forming an electrical connector according to example aspects of the present disclosure.

FIG. 4 illustrates an example method 400 for forming an electrical connector according to example aspects of the present disclosure.

The method 400 can include, at 402, arranging a resilient member, such as a spring, within an outer sleeve. The resilient member can have any suitable configuration, such as a helical spring, leaf spring, or the like. The resilient member can be or include a variety of resilient materials, such as metals, polymeric materials, or any other suitable resilient material.

The method 400 can include, at 404, fitting an inner sleeve within the outer sleeve such that the inner sleeve contacts the outer sleeve and can slide relative to the outer sleeve in a first direction. The resilient member can be configured to bias the inner sleeve away from the outer sleeve in the first direction.

The method 400 can include, at 406, forming an insulating layer over a portion of the outer sleeve. The insulating layer may be formed from a polymer composition such as described above. The insulating layer can be formed over the portion of the outer sleeve using a variety of methods. For example, the insulating layer can be deposited on the portion of the outer sleeve by a variety of suitable deposition techniques, such as over-molding, chemical vapor deposition, and/or physical vapor deposition. In some embodiments, the insulating layer can be separately formed and then arranged over the portion of the outer sleeve.

The method 400 can include, at 408, arranging a grounding layer over at least a portion of the insulating layer such that the insulating layer electrically insulates the outer grounding layer from the outer sleeve. The grounding layer can be formed using a variety of suitable techniques, such as plating, deposition (e.g., chemical vapor deposition, physical vapor deposition, etc.). In other embodiments, the ground layer can be separately formed and then arranged over the portion of the insulating layer.

III. Applications

The electrical connector of the present disclosure can have a variety of applications. For example, the electrical connector may be used to form electric connection with passive components (e.g., capacitors, resistors, inductors, etc.) and/or connection terminals of a substrate, printed circuit board, electrical component, or the like. The electrical connector can be particularly useful for in high frequency applications in which electrical signals having characteristic frequencies of 1 GHz or greater are transmitted via the electrical connector. The grounding sleeve can provide excellent shielding and signal transmission fidelity.

Figure 5:
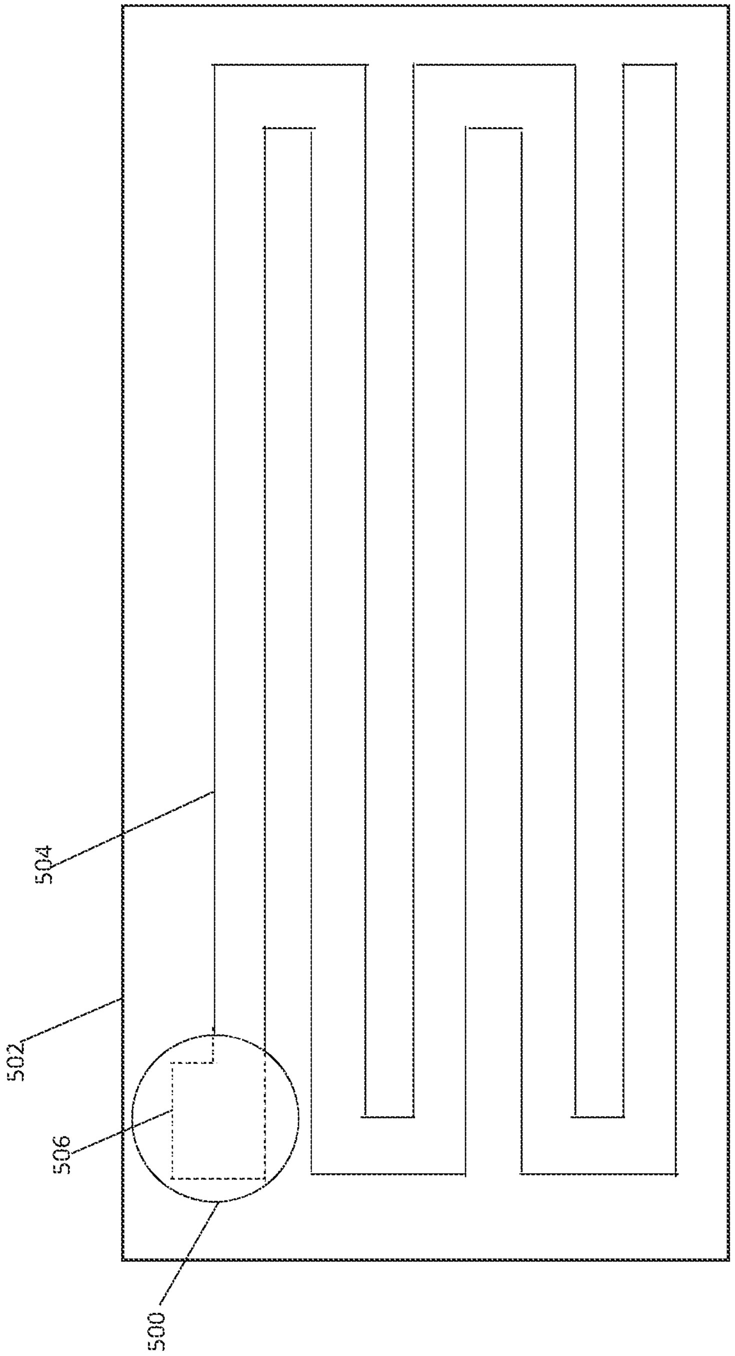
FIG. 5 is a simplified top down view an electrical connector in connection with an antenna structure according to aspects of the present disclosure.

Referring to FIG. 5, as one example application, an electrical connector 500 according to aspects of the present disclosure can be used to form an electrical connection with an antenna structure 502. In some embodiments, the antenna structure can include one or more conductive traces 504 formed using laser direct scribing (LDS). The antenna structure 502 can include a connection terminal 506. The electrical connector 500 can be soldered to the connection terminal 506 to connect the electrical connector 500 with the connection terminal 506. Such LDS antenna structures 502 can generally be configured to operate at high frequencies (e.g., above 1 GHz). As such, the present electrical connector can be particularly well suited for creating high fidelity electrical connections with LDS antenna structures 502.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrical connector having a first end and a second end, the second end opposite the first end along a first direction, the electrical connector comprising:

an outer sleeve;

an inner sleeve received within the outer sleeve such that the inner sleeve contacts the outer sleeve and can slide relative to the outer sleeve in the first direction;

a resilient member configured to bias the inner sleeve away from the outer sleeve in the first direction;

an insulating layer covering at least a portion of the outer sleeve; and a grounding layer covering at least a portion of the insulating layer, wherein:

the outer sleeve defines a planar surface at the second end for surface mounting the electrical connector;

the grounding layer includes a first portion and a second portion, the first portion having a first circular cross-section in the first direction and a first inner radius in a second direction, the second direction perpendicular to the first direction;

the outer sleeve includes a first portion and a second portion, the first portion having a first circular cross-section in the first direction and a first outer radius in the second direction; and the second portion of the outer sleeve extends in the second direction beyond the first outer radius of the outer sleeve and the first inner radius of the grounding layer.

2. The electrical connector of claim 1, wherein:

the grounding layer has a circular cross-section in the first direction and has an inner radius in the second direction;

the outer sleeve has a circular cross-section in the first direction and has an outer radius in the second direction; and a ratio of the inner radius to the outer radius ranges from about 2 to about 1.05.

3. The electrical connector of claim 1, wherein:

the grounding layer has a circular cross-section in the first direction and has an inner radius in the second direction;

the outer sleeve has a circular cross-section in the first direction and has an outer radius in the second direction; and a ratio of the outer radius to the inner radius is selected to provide the electrical connector with an impedance of about 50 ohms.

4. The electrical connector of claim 1, wherein the insulating layer comprises a polymer composition that contains at least one thermoplastic polymer.

5. The electrical connector of claim 4, wherein the polymer composition exhibits a dielectric constant of about 10 or less.

6. The electrical connector of claim 4, wherein the polymer composition exhibits a dielectric loss tangent of about 0.1 or less.

7. The electrical connector of claim 4, wherein the polymer composition has a melting temperature of about 270° C. or more.

8. The electrical connector of claim 4, wherein the thermoplastic polymer includes a polyamide.

9. A method for forming an electrical connector, the method comprising:

arranging a resilient member within an outer sleeve;

fitting an inner sleeve within the outer sleeve such that the inner sleeve contacts the outer sleeve and can slide relative to the outer sleeve in a first direction, and such that the resilient member is configured to bias the inner sleeve away from the outer sleeve in the first direction;

forming an insulating layer over a portion of the outer sleeve, the insulating layer comprising a polymer composition having a melting temperature greater than about 300° C.; and arranging a grounding layer over at least a portion of the insulating layer such that the insulating layer electrically insulates the outer grounding layer from the outer sleeve, wherein:

the grounding layer includes a first portion and a second portion, the first portion having a first circular cross-section in the first direction and a first inner radius in a second direction, the second direction perpendicular to the first direction;

the outer sleeve includes a first portion and a second portion, the first portion having a first circular cross-section in the first direction and a first outer radius in the second direction; and the second portion of the outer sleeve extends in the second direction beyond the first outer radius of the outer sleeve and the first inner radius of the grounding layer.

10. The method of claim 9, wherein the polymer composition contains at least one thermoplastic polymer.

11. The method of claim 9, wherein the polymer composition exhibits a dielectric constant of about 10 or less.

12. The method of claim 9, wherein the polymer composition exhibits a dielectric loss tangent of about 0.1 or less.

13. An electrical system comprising:

a first electrical component having a grounding terminal and a signal terminal;

a second electrical component having a grounding terminal and a signal terminal; and an electrical connector comprising:

an outer sleeve contacting the signal terminal of the second electrical component, the outer sleeve including a first portion and a second portion, the first portion having a circular cross-section in a first direction, the second portion of the outer sleeve contacting the signal terminal of the second electrical component along a planar surface extending beyond the circular cross-section in a second direction that is perpendicular to the first direction;

an inner sleeve received within the outer sleeve such that the inner sleeve contacts the outer sleeve and can slide relative to the outer sleeve in the first direction, the inner sleeve of the electrical connector contacting the signal terminal of the first electrical component;

a resilient member configured to bias the inner sleeve away from the outer sleeve in the first direction;

an insulating layer covering at least a portion of the outer sleeve; and a grounding layer covering at least a portion of the insulating layer, the grounding layer contacting the grounding terminal of the first electrical component and contacting the grounding terminal of the second electrical component, the grounding layer having a circular cross-section in the first direction, wherein:

the grounding layer includes a first portion and a second portion, the first portion having the circular cross-section and the second portion having a length extending beyond the circular cross-section of the grounding layer in the second direction, the length parallel to the planar surface of the outer sleeve and spaced apart from the planar surface of the outer sleeve along the first direction, and the insulating layer including a first portion and a second portion, the second portion having a length extending in the second direction, the length of the insulating layer disposed in the first direction between the planar surface of the outer sleeve and the length of the grounding layer to electrically insulate the grounding layer from the outer sleeve.

14. The electrical system of claim 13, wherein:

the grounding layer has an inner radius in the second direction;

the outer sleeve has an outer radius in the second direction; and a ratio of the inner radius to the outer radius ranges from about 1.05 to about 2.

15. The electrical system of claim 13, wherein:

the grounding layer has an inner radius in the second direction;

the outer sleeve has an outer radius in the second direction; and a ratio of the outer radius to the inner radius is selected to provide the electrical connector with an impedance of about 50 ohms.

16. The electrical connector of claim 1, wherein an uncompressed length of the electrical connector along the first direction ranges from about 1 mm to about 12 mm, and wherein a compressed length of the electrical connector along the first direction ranges from about 0.5 mm to about 10 mm.

17. The method of claim 9, wherein:

the second portion of the grounding layer extends in the second direction beyond the first circular cross-section of the upper portion of the grounding layer;

the second portion of the outer sleeve extends in the second direction parallel to the second portion of the grounding layer; and the insulating layer includes a first portion and a second portion, the first portion of the insulating layer having a circular cross-section, the first portion of the insulating layer positioned between the first portion of the grounding layer and the first portion of the outer sleeve, the second portion of the insulating layer extending in the second direction between the first portion of the insulating layer, and the second portion of the insulating layer positioned between the second portion of the grounding layer and the second portion of the outer sleeve.

18. The method of claim 9, wherein the second portion of the outer sleeve defines a planar surface for surface mounting the electrical connector.

* * * * *